Nov. 18, 1924.                                                    1,516,434
I. E. HOOGNER
CONVERTIBLE BED, TABLE, AND LUGGAGE CARRIER FOR AUTOMOBILES
Filed Feb. 17, 1923                    4 Sheets-Sheet 1
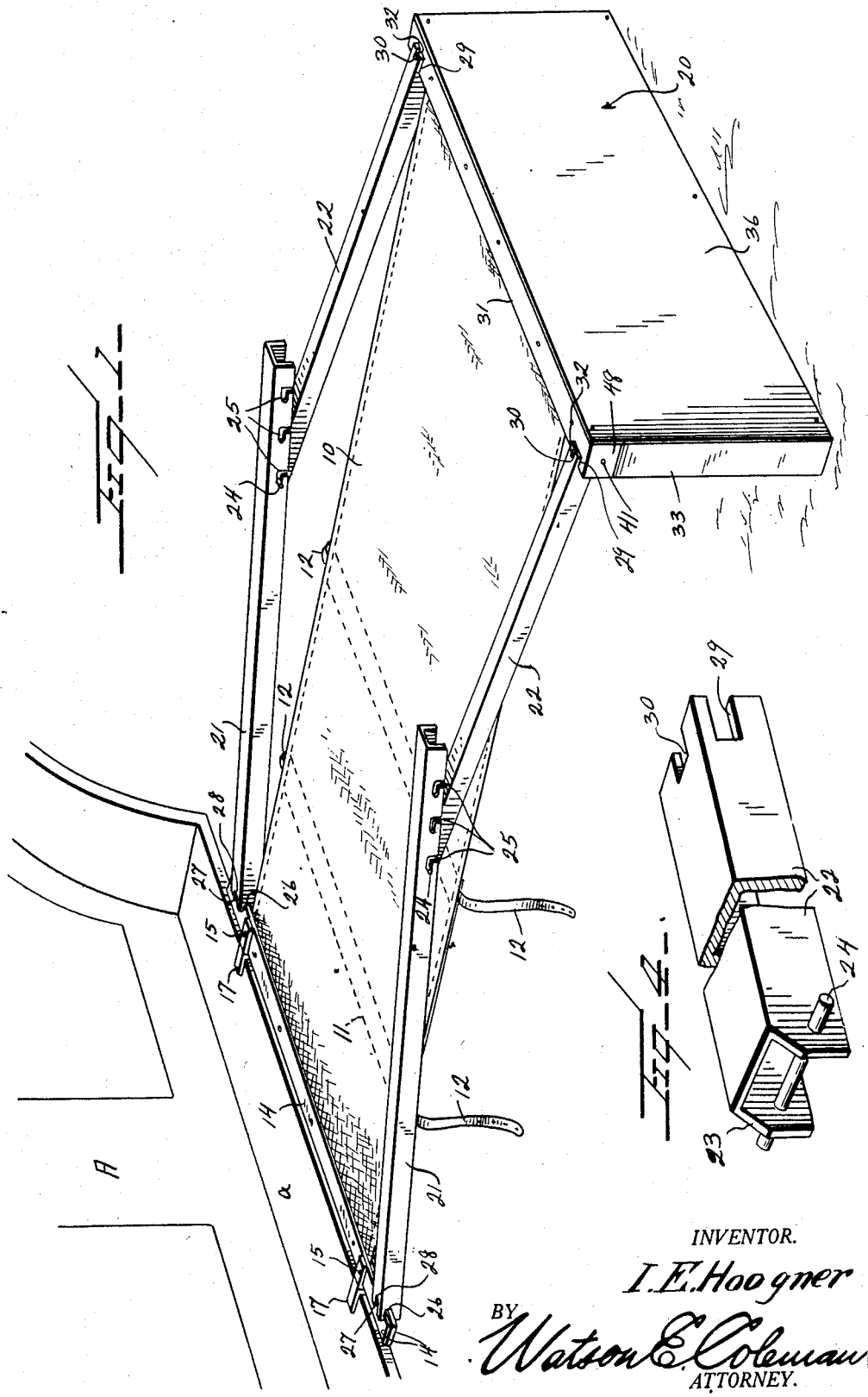
INVENTOR.
I. E. Hoogner
BY Watson E. Coleman
ATTORNEY.

Nov. 18, 1924.
I. E. HOOGNER
1,516,434
CONVERTIBLE BED, TABLE, AND LUGGAGE CARRIER FOR AUTOMOBILES
Filed Feb. 17, 1923  4 Sheets-Sheet 2
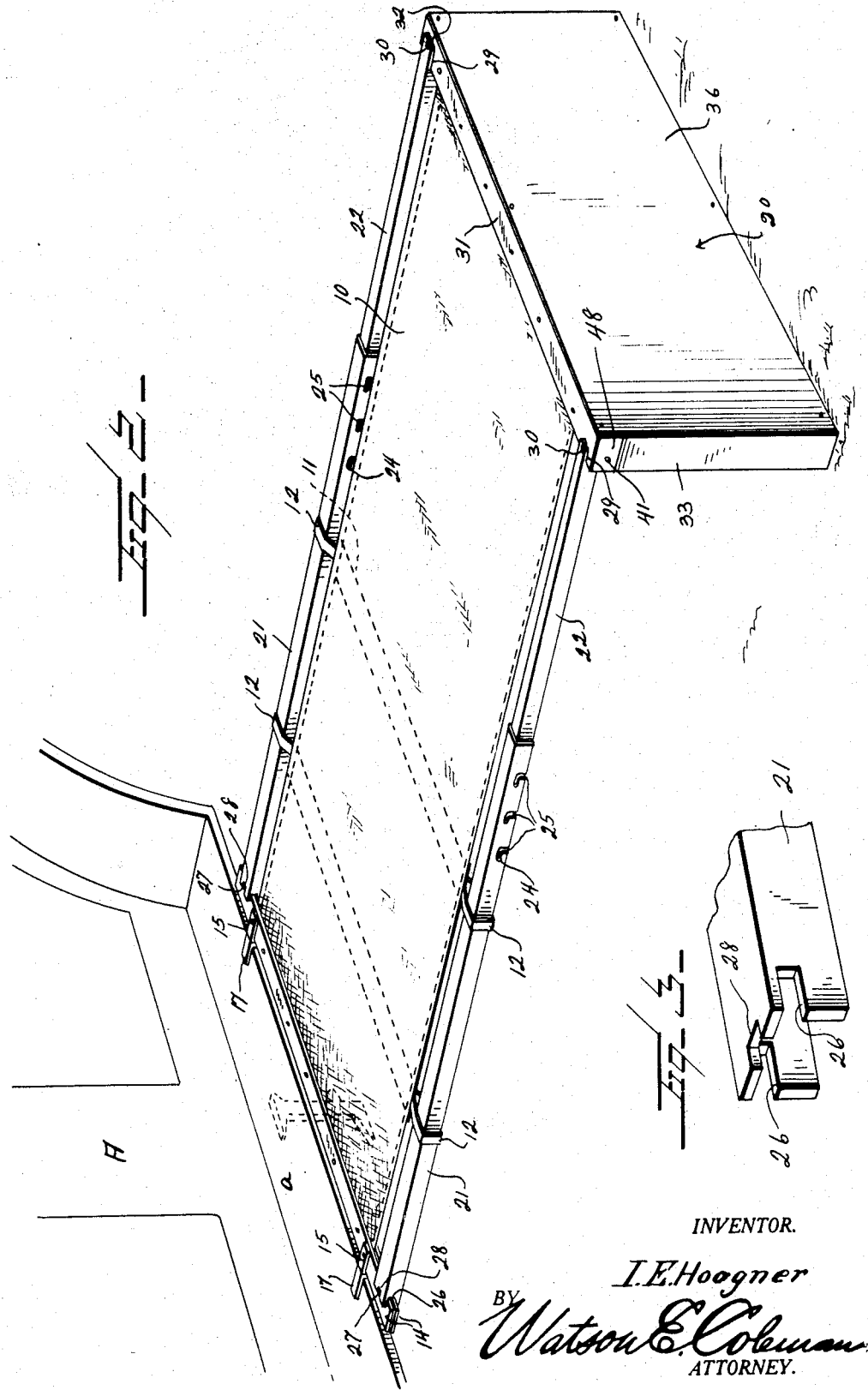
INVENTOR.
I.E. Hoogner
BY Watson E. Coleman
ATTORNEY.

Nov. 18, 1924. 1,516,434
I. E. HOOGNER
CONVERTIBLE BED, TABLE, AND LUGGAGE CARRIER FOR AUTOMOBILES
Filed Feb. 17, 1923 4 Sheets-Sheet 3
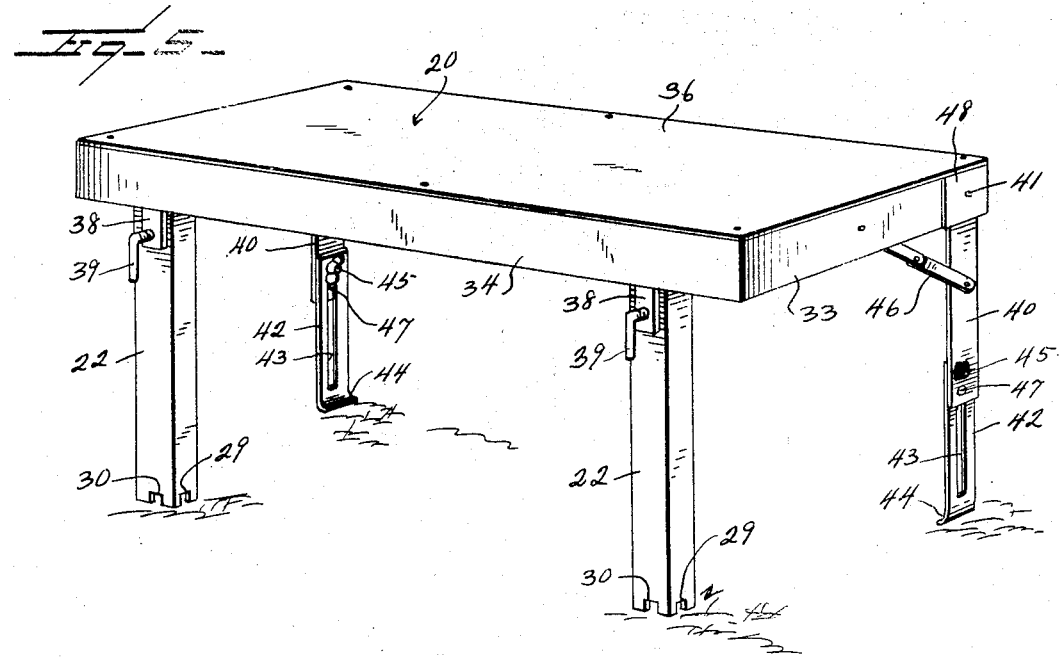
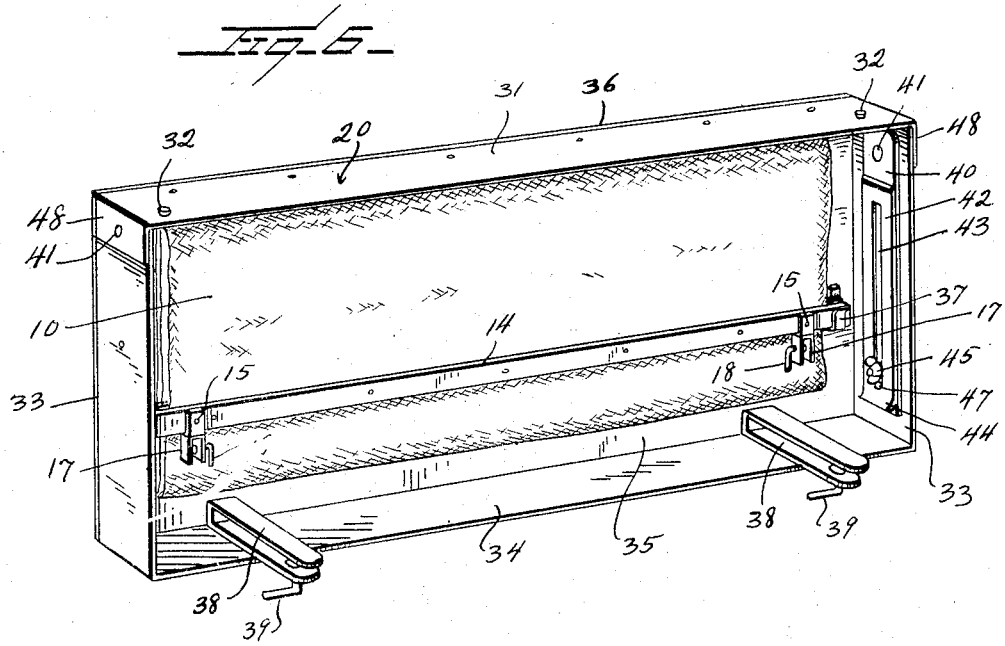
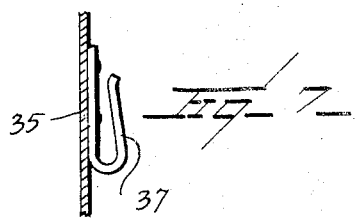
INVENTOR.
I. E. Hoogner
BY Watson E. Coleman
ATTORNEY.

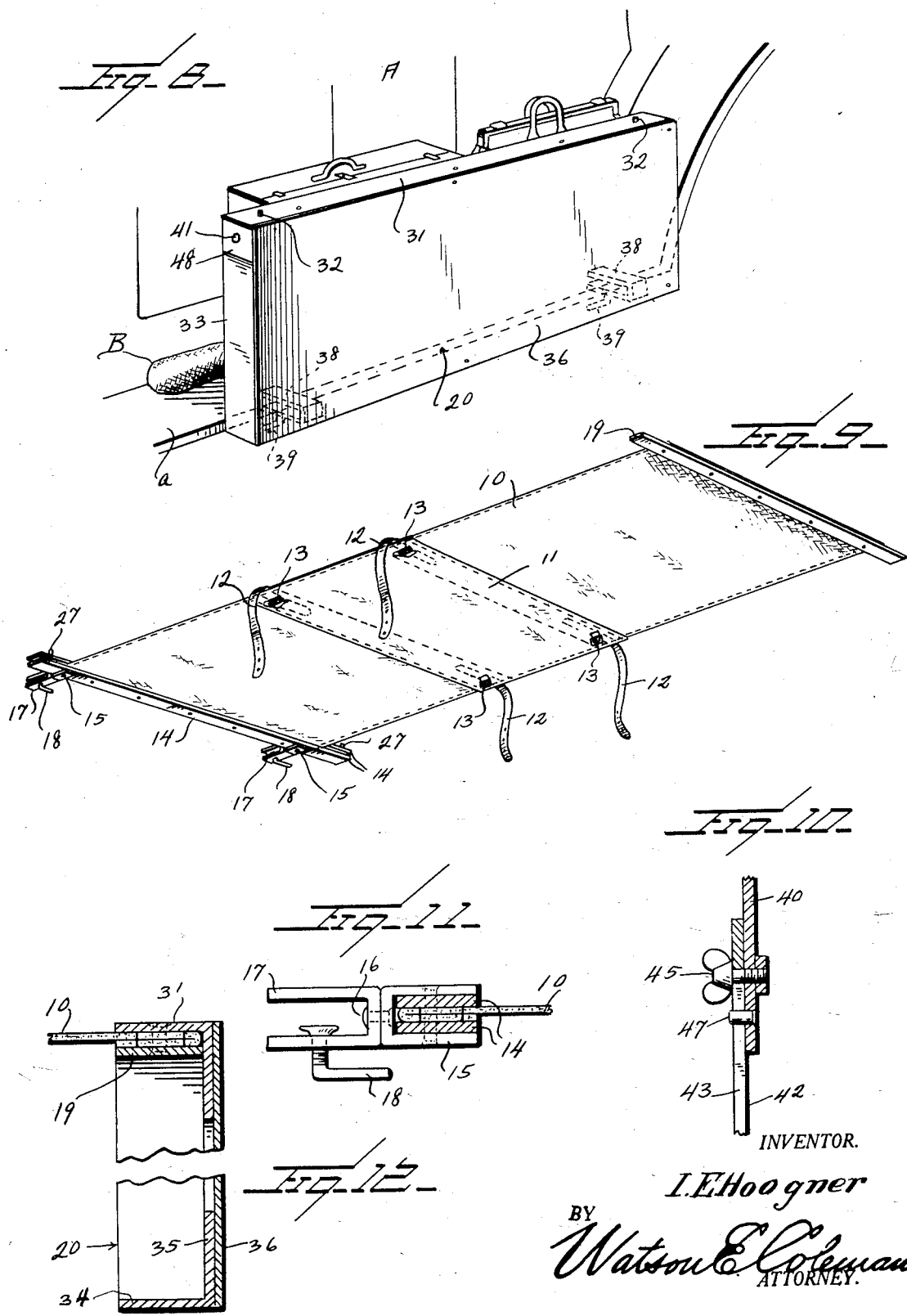

Patented Nov. 18, 1924.

1,516,434

UNITED STATES PATENT OFFICE.

IRVING E. HOOGNER, OF MOLINE, ILLINOIS.

CONVERTIBLE BED, TABLE, AND LUGGAGE CARRIER FOR AUTOMOBILES.

Application filed February 17, 1923. Serial No. 619,691.

*To all whom it may concern:*

Be it known that I, IRVING E. HOOGNER, a citizen of the United States, residing at Moline, in the county of Rock Island and State of Illinois, have invented certain new and useful Improvements in Convertible Beds, Tables, and Luggage Carriers for Automobiles, of which the following is a specification, reference being had to the accompanying drawings.

This invention relates to camping appliances designed to be carried upon and used in connection with an automobile, and particularly to camp beds, tables, and the like devices.

The general object of this invention is primarily to provide a double bed structure which may be readily connected to or disconnected from the running board of an automobile and stretched laterally out therefrom when desired for use, and to so make this structure that a portion of the structure may be used for forming a table, and further to so construct the device that when the bed is folded up within the portion of the structure which is used as a table top, this structure may be disposed upon the running board and form a guard or holder to hold luggage in place upon the running board.

A further object of the invention is to so construct the bed that the canvas of which the bed is composed may be stretched to the proper degree of tension to support two persons, and to so construct these stretching trusses or braces that as the canvas stretches this stretching may be compensated for and the canvas kept tight.

A still further object is to provide means whereby these trusses may be firmly engaged with the running board of the automobile so as to prevent any slippage of the bed structure from a proper engagement with the running board.

Another object is to provide a supporting member for the foot end of the bed with which said trusses are adapted to engage, this supporting member being so formed that the canvas of the bed may be folded up within this foot supporting member and the foot supporting member may be clamped upon the running board to form a luggage holder or guard.

Still another object is to provide means whereby this foot supporting member of the bed may be used with the canvas folded up inside thereof as a table, two sections of the bracing structure being used as legs, and additional legs being pivoted or otherwise operatively connected to the foot supporting member so that they may be turned down to form the two other legs of the table.

A further object is to provide a convertible bed structure of this character which is very simple, which may be very cheaply made, which is compact and light, and which is particularly convenient in actual use.

Other objects will appear in the course of the following description.

My invention is illustrated in the accompanying drawings, wherein:—

Figure 1 is a perspective view of my improved camp bed before it is entirely stretched;

Figure 2 is a like view to Figure 1, but showing the stretching members 21 and 22 shifted to aligned position and stretching the canvas of the bed tight;

Figure 3 is a perspective view of one end of the member 21, showing the manner in which the member 21 is notched or slotted;

Figure 4 is a fragmentary perspective view of the member 22;

Figure 5 is a perspective view of the foot frame when used as a table;

Figure 6 is a perspective view looking at the interior face of the foot frame with the canvas of the bed folded up therein and the legs folded;

Figure 7 is a fragmentary section through the back plate 35, showing the clip for engaging the bars 14;

Figure 8 is a perspective view showing the foot frame mounted upon the automobile running board as a luggage guard or carrier;

Figure 9 is a perspective view of the canvas forming the bed and looking at the under side thereof;

Figure 10 is a fragmentary sectional view through the conjoined leg sections 40 and 42;

Figure 11 is a sectional view through the bars 14, showing one of the clamps 17 in elevation;

Figure 12 is a vertical sectional view through the foot frame showing the manner in which the canvas is held thereto;

Referring to these drawings, and particularly to Figure 9, it will be seen that my construction embodies a length of canvas, designated 10, which is used as the bed proper, that this canvas is operatively connected at one end to the running board *a* of the automobile A, and at its other end is supported by a foot supporting frame. The canvas, as illustrated in Figure 9, may have any desired length or width and the edge of the canvas is turned in for a distance of about half and inch and sewed. Both ends of the canvas are doubled in two inches and sewed, preferably with two lines of stitching.

To the under side of this canvas sheet 10 is attached a section of twelve-ounce duck or like material, designated 11, stitched to the canvas and extending beneath a portion of the sheet 10. A pair of straps 12 are attached on each side of the canvas 10 and preferably to the inner ends of the duck section 11, these straps being of leather and being sewed to the canvas and having buckles 13. That end of the canvas sheet which is designed to be connected to the head board is gripped between two transverse metal bars 14, as illustrated in Figure 11, which are riveted or otherwise attached through the canvas. These metal bars extend beyond the canvas at each end.

Attached to these bars 14 are a plurality of clips adapted to embrace the running board. Each clip consists of a U-shaped base member 15 which embraces the conjoined bars 14, as illustrated in Figure 11, and to this base member is swiveled by means of the rivets 16 a clamping member 17 having upper and lower wings adapted to extend above and below the running board and through one of these wings, preferably the lower, passes a screw clamp 18. By this means it is obvious that one end of the canvas may be securely clamped to the running board of the automobile without any danger of pulling away therefrom. Any number of these clamps may be used. The clamp proper is swiveled to the base 15 so as to permit the clamp to be rotated on the swivel for a purpose hereinafter to be described.

The opposite end of the canvas 10 is also connected to a pair of transverse bars, one of which is designated 19, which are riveted through the canvas. These bars, however, are not provided with clamping means but form part of the upper web of a rectangular frame, designated generally 20, whose detailed structure will be later described. These bars 19 also extend out laterally beyond the canvas.

For the purpose of holding the canvas stretched when it is desired to use the bed, I provide side irons or trusses. These consist of two channel-shaped rods or beams 21 which are relatively long, being in actual practice about 52" long, and two relatively short channel irons or beams 22. The channel irons 22 have telescopic engagement in or slip into the channel irons 21. The side flanges of these ends of the channel irons 22 which are adjacent the channel irons 21 project beyond the upper web of the channel iron and have their upper edges beveled at 23. A pin 24 passes through the side flanges of each channel iron 22, as illustrated in Figure 4, and this pin projects beyond the side flanges. The side flanges of each channel iron 21 are formed with a series of angular slots 25 into which the pin 24 of the corresponding channel iron 22 is adapted to engage. I have shown three of these slots. I do not wish to be limited to the use of channel iron for these side pieces 21 and 22, as pieces of other cross section might be used for this purpose.

The end of each channel iron 21 remote from the slots 25 has its lateral flanges formed with longitudinally extending notches or slots 26 adapted to receive the projecting ends of the transverse reinforcing irons 14 of the canvas 10. These reinforcing irons 14 have at their ends upwardly projecting studs 27 and the upper web of each channel iron 21 is formed with a notch or slot 28 which is adapted to be engaged with this stud so that when the channel irons 21 are engaged with the irons 14 they cannot slip out of this engagement. The opposite end of the channel iron 22 is also formed with longitudinally extending slots or notches 29 in its side flanges and with a notch or slot 30 in its upper web.

The frame 20, it may be remarked, is rectangular in form and has a bottom web, two side webs, and a top web. The upper web is designated 31, and the end of the canvas 10 is disposed between this web 31 and the iron 19 and riveted through the web and iron so that these parts 19 and 31 practically are analogous to the two transverse bars 14. The bar 19 and the web 31 extend laterally beyond the canvas. When the bed is in use, the notches or slots 29 are adapted to engage over the web 31 and the iron 19, while the notches 30 are adapted to engage with rivets or outwardly projecting studs 32 on the ends of the web 31. Thus this end of the bracing structure is supported on the foot member without danger of accidental disengagement. The lateral irons, struts or braces formed of the sections 21 and 22 are ordinarily carried in an elongated bag or other textile case disposed upon the running board, but when it is desired to use it the canvas is pulled out to more or less its full length, the sections 21 and 22 are engaged at their ends with the running board and with the foot board respectively, then the braces or strut sections 21 and 22 are brought into angular relation, as illustrated in Figure 1, and the pin 24 engaged in the proper slot 25 and then these sections 21 and 22 are forced downward until each section 21 is in line with its corresponding section 22 (see Fig. 2). This will obviously stretch the canvas taut and hold the canvas against sagging. When the canvas is new the pin 24 in each section 22 will preferably be engaged with the slot 25 which is nearest the running board, and then as the canvas stretches from use the pin 24 may be engaged with the next succeeding slot 25 until, when the canvas is fully stretched, the pin 24 is engaged with the last slot of the series. I have illustrated three of these slots 25, but it will be obvious that more or less may be used if necessary. When the canvas has been fully stretched, the straps 12 are brought around the side irons of the struts 21 and 22 and drawn up tightly so as to support the side margins of the canvas, particularly at those points where the greatest weight comes.

The frame 20, as before remarked, is rectangular in form and consists of the top web or plate 31, the end plates 33 and the bottom web or plate 34. These webs are preferably angular in cross section so as to provide the flange 35 to which a sheet of metal 36 which forms the outside face of this foot supporting frame is riveted or otherwise attached. This frame is provided at two points with the spring clips 37. Attached to the lower plate 34 are two U-shaped clamps 38 having upper and lower wings and through the lower wings pass the screw clamps 39. These clamps are adapted to engage the running board of the automobile when this foot piece 20 is used as a luggage holder, rack or guard, but these clamps are also designed to be used for engagement with the sections 22 to form legs on one side of this foot supporting frame 20 when the latter is used as a table. The other two legs of the table are formed of members 40 which are pivoted to the end flanges of the foot supporting frame at 41 and folded up against the end flanges of the frame. These members 40 are too short to form supporting legs themselves and, therefore, upon each leg section 40 there is disposed an extension leg section 42 which is longitudinally slotted at 43 and formed with a foot 44, this foot 44 being formed by angularly bending the lower end of the iron 42. A bolt with a thumb nut or equivalent device 45 is attached to the leg section 40 and passes through the slot 43 and thus the section 42 can be telescoped into the section 40 or pulled out therefrom to its full extent, and when pulled out constitutes a leg, these legs consisting of the sections 40 and 42 being held in supporting position perpendicularly to the sheet metal web 36 by means of pivoted folding braces 46 of any suitable or desired type.

Preferably the lower end of the leg section 40 has in addition to the thumb nut or thumb screw 45 a pin or rivet 47 which extends into the slot 43 and, of course, prevents any tendency of the section 42 turning upon the section 40 when extended. Preferably a nut is attached to the iron 40 and a thumb screw 45 is used for holding the two sections 40 and 42 in adjusted position. The braces 46 are formed in two sections pivoted to each other, one of the sections being pivoted to the leg section 40 and the other section being pivoted to the end flange to which the section 40 is pivoted. This will be obvious from Figure 5. Preferably the web 31 is carried over the end webs 33 and extended downward at 48 and riveted to the end web.

When it is desired to pack up the bed structure, the clamps 17 and 18 are disengaged from the running board of the automobile and the canvas folded up within the frame 20 so as to lie against the sheet metal web 36. The irons 14 are then inserted beneath the spring clamps 37, as illustrated in Figure 6, the swiveled clamps 17 being turned so as to lie edgewise and the clamping screw 18 being so disposed that it cannot mar or scratch baggage if the foot frame is mounted upon the running board of the automobile for the purpose of holding baggage.

If it now be desired to use this device as a table, the sections 22 are disposed vertically between the clamps 38 and clamped in position and the leg sections 40 and 42 are turned downward into a vertical position and the two sections adjusted and clamped. The top of the table is then formed by the sheet metal 36 and this table has four legs, two of these legs being braced by the braces 46 and the other two legs being rigidly held by the clamps 38. These sections 22 are ordinarily about 28" long and the leg sections 40 and 42 will have a combined length when extended of 28". Thus the table will be fully supported and will perform all the functions of an ordinary table, the canvas being folded within the frame 20 by the cross bar formed of the two irons 14 engaged with the clips 37.

When the foot frame is to be used as a holder or guard for luggage, the clamps 38 are to embrace the foot board and then the screws 39 are turned up until the device is fully clamped upon the foot board, as illustrated in Figure 8. The luggage may then be placed on the running board behind this foot frame, as shown in Figure 8, and is safely held from accidental dislodgment. As before remarked, there is provided a long canvas sack for the struts or braces 21 and 22 and in traveling these brace sections are placed in this sack B and are disposed behind the luggage so that there is no danger of losing the parts. These irons will just about reach from fender to fender and, therefore, there is no danger of their being lost off the car.

In arranging this structure for a bed, it is best to first place an ordinary jack beneath the middle of the running board and lift it slightly, then clamp the canvas to the running board and stretch the canvas by means of the braces 21 and 22, as heretofore described. This jack will prevent the running board from sagging under the weight of a person resting on the bed.

The manner in which this structure is set up to form a bed, table, and luggage carrier has been detailed and, therefore, it is not believed necessary to describe these operations over again. The device is very compact, simple, may be very cheaply made, and constitutes three articles in one, namely a bed, table, and a luggage carrier or holder. Under ordinary circumstances a tent fly will be used extending over the bed and supported from the automobile in any suitable manner. This is quite usual in automobile campers and needs no description of illustration.

While I have illustrated this device as being attached at one end to the running board of an automobile, it will be understood that it might be engaged with any structure by means of the clamps on the end irons of the canvas bed, or that the transverse bars which are attached to this end of the length of canvas might be connected by ropes to a tree or other support and thus the bed be suspended without attaching it to the automobile running board.

While I have illustrated details of construction which have been particularly designed to make the structure practical, simple, compact, and easily manufactured, I do not wish to be limited to these details, as it is obvious that they might be varied in many ways without departing from the spirit of the invention.

I claim:—

1. A convertible bed attachment for automobiles comprising a length of fabric, a rectangular foot frame to which one end of the fabric is attached, a transverse bar attached to the opposite end of the fabric from the foot frame and extending beyond the fabric on each side, means on said bar whereby it may be engaged with the running board of an automobile, laterally disposed members formed for engagement with said bar at one end and with said foot frame at the other end and formed each in two sections longitudinally adjustable to stretch the fabric, said laterally disposed members having engagement with the foot frame and with the bar on each side of the fabric, the foot frame having means whereby it may be supported in a horizontal position to form the frame of a table or whereby it may be supported in a vertical position on the running board of the automobile.

2. In a convertible bed attachment for automobiles, a length of fabric, a rectangular foot frame to which one end of the fabric is attached, said frame being closed at one side, the other side of the frame being open, means at the opposite end of the fabric whereby it may be engaged with the running board of an automobile, means for stretching the fabric when so engaged, the canvas being foldable into said foot frame, the frame having means whereby it may be supported with its closed side in a horizontal position to form a table or whereby it may be supported with its closed side in a vertical position on the running board of the automobile.

3. In a convertible bed attachment for automobiles, a length of fabric, a rectangular foot frame to which one end of the fabric is attached, said frame being closed at one side, the other side of the frame being open, means at the opposite end of the fabric whereby it may be engaged with a supporting means, means for stretching the fabric when so engaged, the fabric being foldable into said foot frame, the frame having foldable legs whereby it may be supported in a horizontal position with its closed side in a horizontal plane to form a table and having means whereby it may be supported with its closed side in a vertical position upon the running board of the automobile to form a luggage holder.

4. A convertible bed attachment for automobiles including a length of fabric, transversely extending bars disposed on each face of the fabric at one end thereof and attached thereto, said bars projecting beyond the fabric at each end, clamps swivelled to the side edges of said transverse rods, foot supporting frame including a transverse bar to which the canvas is permanently attached, the foot supporting frame being rectangular in form and having one side closed, clips attached to the inside face of said closed side with which the first named transverse bars are adapted to engage when the canvas is folded up within the foot supporting frame, means for stretching the canvas and urging the foot supporting frame away from the transverse bars comprising side members adapted to be disposed on each side of the canvas, each of said members being composed of two sections, each of said sections being channel-shaped in cross section and one of the sections having sliding engagement within the other section, one of said sections of each member being formed with a pair of notches in its side flanges and the other member having a transversely extending pin adapted to engage in said notches, the sections being adapted to be turned from an obtusely angled relation into an aligned relation, the outer ends of said sections having their side flanges longitudinally slotted to embrace the transverse bars at one end of the canvas and the transverse bar of the foot supporting frame at the other end of the canvas, said foot supporting frame on the under side being provided with clips adapted to engage with the running board of the automobile and support said foot supporting frame in a position to act as a luggage carrier, a pair of legs pivoted to the end members of the foot supporting frame and adapted to be turned into a position perpendicular to the closed side of said frame, and clamps carried upon said foot supporting frame, two of the sections of the side members being adapted to be engaged with said clamps on the foot supporting frame to form legs.

5. A convertible bed attachment for automobiles including a length of fabric, transversely extending irons disposed on each face of the fabric at one end thereof and attached thereto, said irons projecting beyond the fabric at each end, clamps swivelled to the side edges of said transverse rods, a rectangular foot supporting frame including a transverse bar to which the fabric is permanently attached, the foot supporting frame being rectangular in form and having one side closed, clips attached to the inside face of said closed side with which the first named transverse bars are adapted to engage when the fabric is folded up within the foot supporting frame, means for stretching the fabric and urging the foot supporting frame away from the transverse bars comprising members adapted to be disposed on each side of the fabric, each of said members being composed of two sections, each of said sections being channel-shaped in cross section and one of the sections having sliding engagement within the other section, one of said sections of each member being formed with a pair of notches in its side flanges and the other member having a transversely extending pin adapted to engage in said notches, the sections being adapted to be turned from an obtusely angled relation into an aligned relation, the outer ends of said sections having their side flanges longitudinally slotted to embrace the transverse bars at one end of the fabric and the transverse bar of the foot supporting frame at the other end of the fabric, said foot supporting frame on the under side being provided with clips adapted to engage with the running board of the automobile and support said foot supporting frame in a position to act as a luggage carrier, a pair of legs pivoted to the end members of the foot supporting frame and adapted to be turned into a position perpendicular to the closed side of said frame, said legs being formed of two longitudinally adjustable sections with means for locking the sections in extended position, two of the sections of the side members having a length equal to the length of the legs when extended and being adapted to be engaged by the clamps on the frame and thereby form legs for the frame.

6. A convertible bed attachment for automobiles comprising a flexible bed proper formed of a length of flexible material, means at one end of the flexible material whereby it may be operatively connected to a supporting member, a foot supporting frame to which the opposite end of the length of flexible material is connected, said foot supporting frame being rectangular in form and including a sheet of metal extending over one face of the frame and forming a table top when the frame is disposed in a horizontal position, the length of flexible material being adapted to be folded up within the foot supporting frame, means within the frame for holding the flexible material in its folded condition, legs for the frame when the latter is used as a table, and means on the frame whereby it may be clamped upon the running board of an automobile in a vertical position to act as a luggage holder.

In testimony whereof I hereunto affix my signature.

IRVING E. HOOGNER.